P. N. JONES.
PASSENGER CAR.
APPLICATION FILED JAN. 15, 1916.
1,236,943.
Patented Aug. 14, 1917.
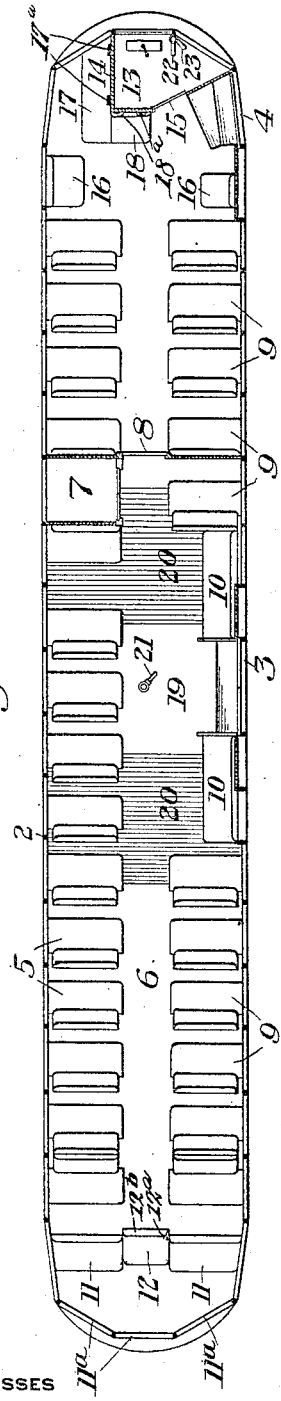
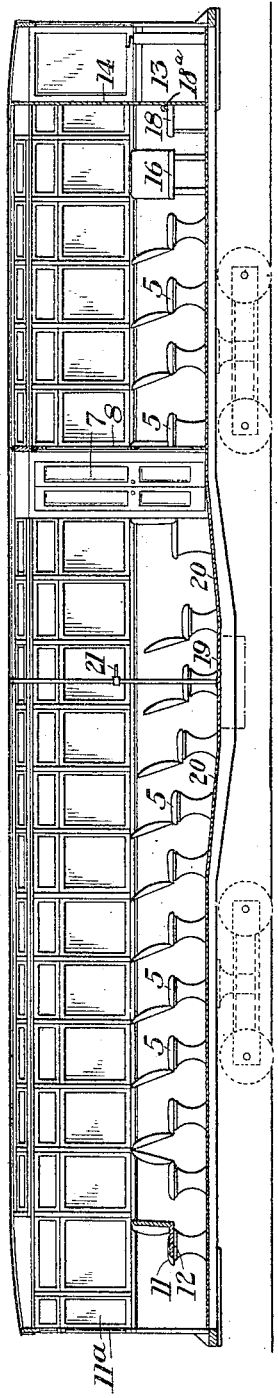
WITNESSES
INVENTOR

UNITED STATES PATENT OFFICE.

PEARL N. JONES, OF PITTSBURGH, PENNSYLVANIA.

PASSENGER-CAR.

1,236,943.      Specification of Letters Patent.      Patented Aug. 14, 1917.

Application filed January 15, 1916.   Serial No. 72,224.

*To all whom it may concern:*

Be it known that I, PEARL N. JONES, a citizen of the United States, residing at Pittsburgh, in the county of Allegheny and State of Pennsylvania, have invented a new and useful Improvement in Passenger-Cars, of which the following is a full, clear, and exact description, reference being had to the accompanying drawings, forming part of this specification, in which—

Figure 1 is a sectional plan view of a passenger car embodying my invention; and Fig. 2 is a longitudinal section of the same.

My invention has relation to passenger cars, and more particularly, to cars designed for use on suburban and interurban electric roads.

The object of my invention is to provide for a maximum seating capacity and for the utilization of the entire floor space of the car to the best advantage.

Referring to the accompanying drawing, in which I have shown the preferred embodiment of my invention, the numeral 2 designates the body of the car. The car shown is a single end car having a doorway 3 at its central portion at one side, and a doorway 4 at the forward end portion at the same side.

At the same side of the car opposite the doorway 3, I provide cross seats 5, extending from the central aisle space 6 to the side of the car, these seats being in a continuous row except that a toilet room 7 may be provided between two of the adjacent seats. A door 8 may be provided across the aisle so as to divide the forward portion of the car into a smoking compartment. Cross seats 9 are also provided at the opposite side of the car at both sides of the doorway 3. In order to give increased room at the central portion of the car for the incoming passengers and for the conductor, the two seats 10, directly at either side of the doorway 3, are arranged longitudinally of the car. At the rear end of the car, I provide the rearwardly facing observation seats 11, one at each side of the aisle space, and I may also close off the aisle space between these seats by means of a hinged seat 12, capable of being turned upward and laterally to give access to the seats 11. Accordingly this seat 12 is provided with hinges 12$^a$ at one end thereof, connected to the end portion of the adjacent seat 11. The back portion 12$^b$ of this seat 12 is offset forwardly with respect to the backs of the seats 11, so that when the seat 12 is turned upwardly, the back 12$^b$ will rest behind the back of the seat 11 to which the seat 12 is hinged. The seats 11 directly face the rear end of the car, which is provided with observation windows at 11$^a$.

At the front end of the car is the motorman's cab 13, which is inclosed by the bulkheads or partitions 14, with a door 15 giving access thereto from the body of the car. 16 designates two short seats, one on each side just back of the motorman's cab, and which face the aisle space. I also preferably provide the two hinged seats at 17 and 18, one facing the closed side of the car and the other facing rearwardly, these being hinged or pivoted directly to the bulkheads or partitions forming the cab. The hinges for the seats 17 and 18 are indicated at 17$^a$ and 18$^a$, respectively. When the car is not crowded with passengers, these seats may be turned upwardly and the space utilized for packages and the like. It will be noted that by means of this arrangement at the front end of the car, this end of the car is also provided with an observation portion. By arranging the toilet room 7 at the central portion of the car, I am thus able to provide for observation portions at each end of the car.

The car is preferably of the drop center portion type, the doorway 3, which is preferably the entrance, leading on to a low level platform 19, with ramps 20, extending upwardly therefrom to the front and rear main floor level. The conductor is stationed on the platform 19, and I preferably provide suitable connections which may be operated by the handle 21 at this station for controlling the doors 3. Any suitable door-operating connections may be provided, these forming no part of my present invention. Door-controlling handles 22 and 23 are also provided in the motorman's cab, one of these handles controlling suitable connections for operating the door at the doorway 4 and the other for operating the door at the doorway 3. These connections again form no part of my present invention, and hence are not shown in detail, connections suitable for the purpose being well known in the art.

It will be seen from the foregoing that I provide a maximum seating capacity while at the same time the seats are so arranged as to give a comparatively large amount of free floor space at the central portion of the car and also at the forward end.

I do not desire to limit myself to the precise arrangement of the seats and other parts shown and described, as these may be changed in detail without departing from the spirit and scope of my invention as defined in the appended claims.

I claim:

1. A passenger car of the central entrance type having a center aisle space with seats arranged at either side thereof, there being an observation portion at each end of the car, and a toilet room at the central portion of the car at one side of the aisle space, substantially as described.

2. A passenger car having a central aisle space, cross seats arranged at each side of the aisle space at the rear portion of the car, the rear cross seats at each side facing rearwardly, and a hinged or pivoted middle cross seat arranged to close off the aisle space between the rearwardly facing cross seats, substantially as described.

3. A passenger car having a central aisle space with cross seats arranged at opposite sides thereof at the forward portion of the car, bulkheads or partitions forming a motorman's cab at the front end of the car, a side exit doorway at the rear of the motorman's cab, short laterally facing seats adjacent to said doorway and cab at opposite sides of the car, and other seats hinged or pivoted to the bulkheads or partitions forming the said cab, substantially as described.

4. A passenger car having a central aisle space, cross seats arranged at each side of the aisle space at the rear portion of the car, the rear cross seats at each side facing rearwardly, the car having rear observation windows faced by said seats, together with a middle cross seat arranged to close off the aisle space between said rearwardly facing cross seats, said middle seat being hinged at one end portion to the end portion of one of said rearwardly facing cross seats and arranged to be turned upwardly and laterally on its hinges, substantially as described.

5. A passenger car having a side doorway at one side approximately midway of the length of the car, an observation rear end, and an aisle space with seats at opposite sides thereof, the rear seats directly facing the observation end, together with a middle cross seat arranged to close off the aisle space between said rearwardly facing cross seats, said middle seat being hinged at one end portion to the end portion of one of said rearwardly facing cross seats and arranged to be turned upwardly and laterally on its hinges, said middle seat having its back portion offset forwardly with respect to the back portion of the adjacent rearwardly facing seat to which it is hinged, substantially as described.

6. A passenger car having a central aisle space, cross seats arranged at opposite sides thereof at the forward portion of the car, bulkheads or partitions forming a motorman's cab at the front end of the car, said cab terminating at the closed side of the car at a distance from the side wall thereof to thereby form an observation space at one side of such cab, and a seat in such observation space hinged to the partition wall, substantially as described.

In testimony whereof, I hereunto set my hand.

PEARL N. JONES.

Witnesses:
GEO. K. McGUNNEGLE,
F. W. ERNST.

Copies of this patent may be obtained for five cents each, by addressing the "Commissioner of Patents, Washington, D. C."